United States Patent Office 3,335,743
Patented Aug. 15, 1967

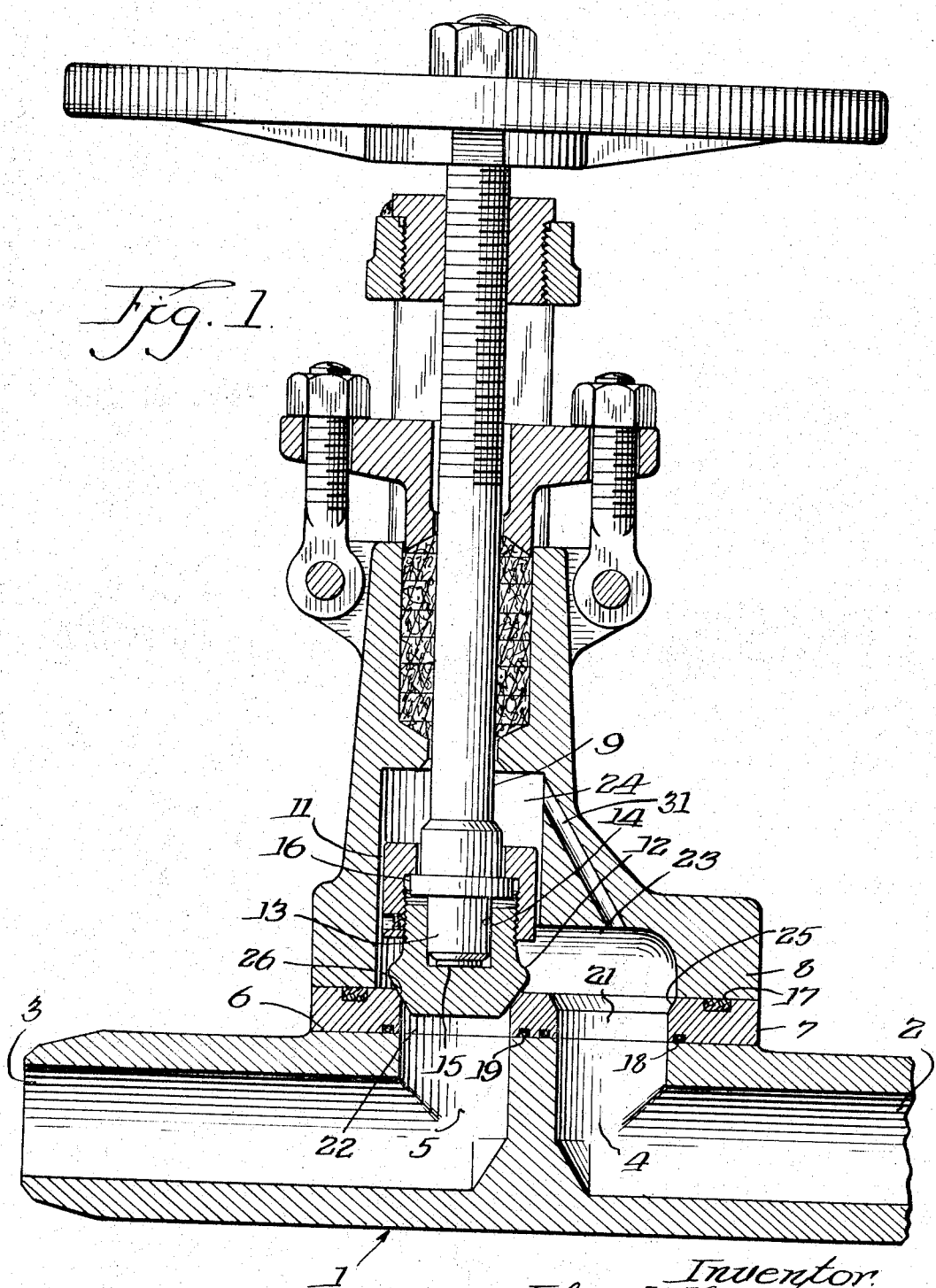

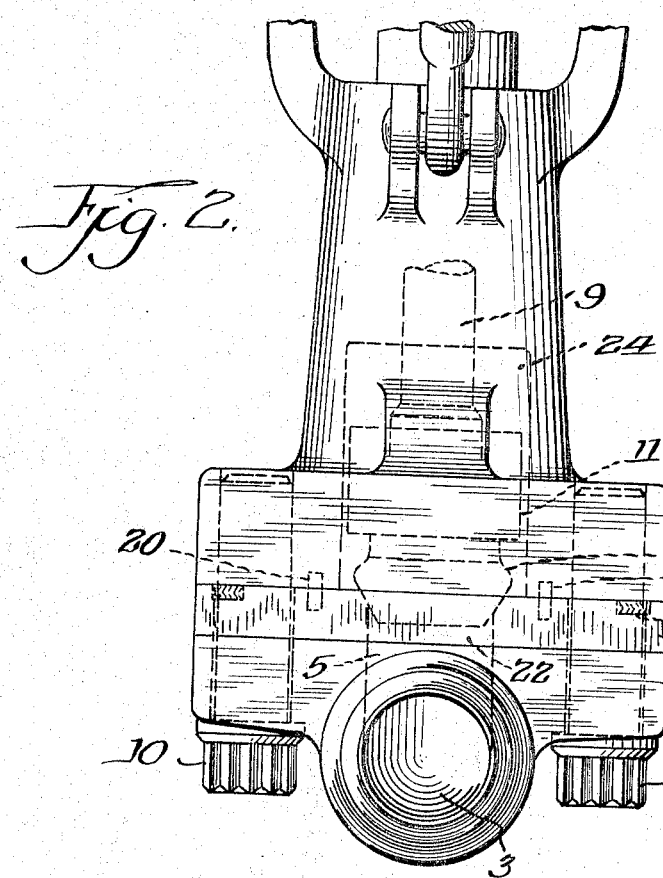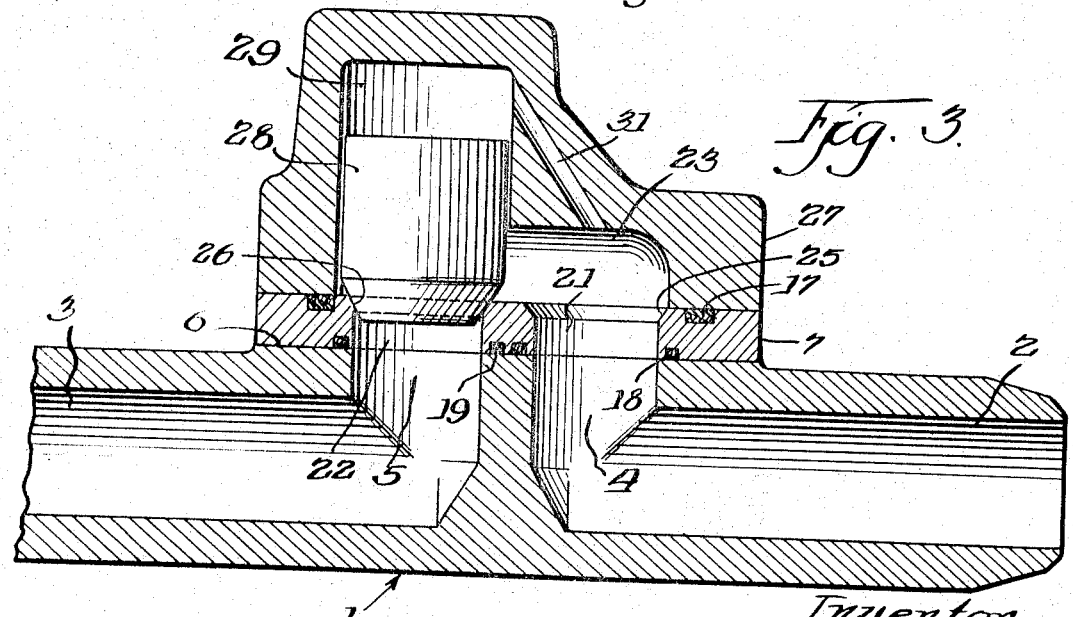

3,335,743
RENEWABLE VALVE SEAT CONSTRUCTION
John A. McInerney, Evergreen Park, Ill., assignor to Crane Co., Chicago, Ill., a corporation of Illinois
Filed Feb. 26, 1963, Ser. No. 261,102
1 Claim. (Cl. 137—329.01)

This invention relates broadly to valves, and, more specifically, it is concerned with a valve seat construction possessing the advantage of what is termed a quick-change trim to those skilled in the art.

One of the important objects of this invention is to provide a valve in which there is greater manufacturing economy and greater flexibility in permitting desired replacements and repairs.

A further object is to provide for a renewable valve seat construction in which a minimum amount of skill is required for the assembling and servicing of the valve of this invention.

Another important object is to provide for a valve in which a renewable seat is featured, wherein the seat comprises a relatively simple flat plate, the said plate being suitably apertured to provide for the usual seating of the closure member while providing a portion of the flow path through the valve.

A further object is to provide for a valve construction in which the seat is positively and simply clamped between the body or casing of the valve and a flange forming a portion of the valve bonnet.

A further object is to provide for a valve construction in which the body or casing permits of a simple face grinding operation with a relatively economical and effective method for providing the predeterminedly communicating port openings through the valve.

A further object in connection with the valve construction of this invention is to provide for a renewable seat in which the gasket employed to cooperate therewith requires only a simple external face for easy re-surfacing when and if required in the field. Such arrangement makes it unnecessary to require the removal of the valve body itself from the pipe line for reconditioning because of the ease in which the valve seat can be removed, inspected, replaced or repaired. The seat construction provided herein is relatively simple and easily available to thereby eliminate the need for a spare part. The latter advantage is accomplished by providing a seat ring preferably round plate configuration having a second port opening and seat face therein. Thus by merely rotating the plate, ready availability of a new seat face is provided and the need for a spare seat ring in stock is eliminated.

A further object is to provide for a valve closure member and seating surfaces therefor, in which during the initial valve assembly the checking of the closure member seat bearing alignment is easily accomplished by merely clamping the seat plate between the bonnet and body and then pre-loading the closure member as desired. Conventional valves lack such ease of accessibility and there is an increased problem in checking the accuracy of the seat assembly.

A further object is to provide for a valve in which preferably the valve closure member is fully guided in the bonnet bore of the valve, because of the location of the plane or level in which the seat is provided, thus contributing to desirable compactness.

A further object of the valve of this invention is to provide for a relatively simple arrangement in which installation mistakes, that is, whether the line fluid pressure is above or below the valve seat, is corrected by simply rotating the bonnet assembly so that the seating between the closure member and seat is reversed from that shown and rotating the renewable seat plate as desired.

Another object of this invention is to provide for a renewable seat construction in which the gasket therefor are fully enclosed. This provision permits the use of available gaskets and/or metal O-rings to effect fluid sealing joints in a simple manner.

A further object is to provide for a valve construction in which thermal shock and vibration conditions do not adversely affect the seat or gasket joints because of the manner in which the renewable seat plate is clamped between the valve body and bonnet.

A further object is to provide for a valve construction having such flexibility that it becomes relatively simple either in original manufacture or in the field to convert from a stop valve to a lift check valve.

A further object is to provide for a sufficiently flexible valve construction in which the prior need for relatively large stock inventories of parts is reduced to a minimum.

Other objects and advantages will become more readily apparent upon proceeding with the specification read in light of the accompanying drawings, in which:

FIG. 1 is a sectional assembly view of a form of valve embodying my invention;

FIG. 2 is an exterior end view of the valve shown in FIG. 1; and

FIG. 3 is a modified form of the valve embodying my invention.

Similar reference numerals refer to similar parts throughout the several views.

Referring now to FIG. 1, a valve body or casing 1 is shown with the usual inlet 2 and outlet 3, having therebetween the connecting circular upturned ports 4 and 5. The casing at its upper limit is provided with a preferably flat annular surface 6 upon which is mounted in fluid sealing relation a renewable seat member 7 and which is firmly held in clamped position by means of the bonnet 8 functioning in the usual manner of regular valve construction.

Journalled within the bonnet 8 is a valve stem 9 attached by means of a threaded disc-stem-ring 11 to the valve closure member 12. The innermost end of the stem is formed with a depending portion as at 13 received within the disc chamber 14 and bearing against a thrust washer 15. The stem 9 is provided with a collar 16 clamped between the disc stem ring 11 to effect the connection between the stem and the closure member 12. The renewable seat 7 is preferably provided with a suitable sealing means, such as the gasket 17 and the O-rings as at 18 and 19 encircling the circular ports 4 and 5 respectively.

An important feature of the invention lies in having the port openings 21 and 22 is side by side relation so as to communicate with the respective casing ports 4 and 5, the bonnet being suitably formed as at 23 to connect the ports 4 and 21 with the ports 5 and 22. While the bonnet is shown with a guide chamber 24 for the closure member 12, it will, of course, be appreciated that this is not absolutely necessary. Each of the ports 21 and 22 is preferably provided with an annular seat as at 25 and 26. One seat, namely, 25, in the assembly illustrated, functions as a spare seat when and if the seating surface 26 becomes unusable in the normal course of service. By merely disconnecting the valve bonnet 8 from the casing 1 and suitably rotating the renewable plate 7 to the rotative position in which the plate port 21 coincides with the casing port 5, the valve is now provided with the replacement valve seat 25 and is ready for additional service, making it unnecessary to remove the valve casing from the pipe line in effecting said significant change in the valve. As shown more clearly in FIG. 2, alignment pins 20 may be used to align the valve bonnet 8 with the respective plate 7 and casing 1.

Referring now to the modified form of construction shown in FIG. 3, it will be appreciated that the renewable seat construction of this invention permits of an unusual degree of flexibility in the type of valve which may be employed. Specifically, for example, the stop valve of FIG. 1 may be converted into a lift check valve by the simple expedient of substituting in place of the bonnet 7 a bolted cap member 27. The later member is attached to the casing in the same manner as described in connection with FIGS. 1 and 2, clamping the renewable valve seat 7 in position as shown. In this construction, instead of a valve stem 9 being employed, the closure member is assembled with the substitute disc or closure member 28. This member responds to line fluid pressure below the seat 26 to lift the closure member 28 as desired in response to change in fluid pressure functioning in the usual manner. The valve closure member 28 thus moves reciprocally within the valve chamber 29 to and from the valve seat 26. It will thus be apparent that by the simple expedient of converting a stop valve to a lift check valve, all that is required is to substitute a cap 27 for the stop valve bonnet 8 described in connection with FIGS. 1 and 2 and replacing the manually actuated closure member with a pressure responsive closure member 28. In all other respects, the valve assembly remains substantially unchanged, making it unnecessary to remove the valve casing 1 from the pipe line which minimizes shutdown time normally required.

The cap 27 is provided with the conventional aspirator and vent bleed opening 31.

Thus, if it should be necessary at any time to replace a stop valve within a line in which a connection is made to a pump, for example, and thereby control the pump fluid by means of a check valve, the conversion above referred to is easily accomplished.

The valve may be manufactured considerably cheaper than valves usually employed wherein the stop valve differed substantially from the lift check valve or vice versa. In addition, since the changes are so relatively simple, they can be done by comparatively unskilled labor in the field quickly and without costly shutdowns.

It will also appreciated that in view of the fact that the renewable seat construction is employed, various types of seating materials may form the basis for manufacturing the renewable seats to meet easily and economically the service conditions in the field or in manufacturing processes. For example, the entire renewable seat plate may be made of a chromium-cobalt-tungsten alloy, frequently employed as an overlay material in past conventional valves. Thus, the need for a costly weld deposition is eliminated.

It should now be apparent that a significant contribution has been made to the valve construction field and while only a pair of embodiments have been illustrated and described, the invention is capable of such broad application that its scope should be measured by the terms of the appended claim interpreted in light of the prior art.

I claim:

In a renewable valve seat, the combination including:
(a) a valve body having inlet and outlet ports with upturned portions in side by side relation;
(b) a valve bonnet having a chamber connecting the upturned portions of said inlet and outlet portions;
(c) a renewable flat plate valve seat member adapted to be fixedly clamped between opposed flat surfaces on said body and bonnet; and,
(d) annular fluid sealing means cooperating with said flat surfaces and said seat member; said seat member having a plurality of apertures within said fluid sealing means coinciding with said inlet and outlet upturned portions, each of said apertures being defined by a seating surface for a reciprocally movable valve closure member, said seat member being positionable in a plurality of aperture-upturned portion aligned positions to serve alternatively for selective cooperation as a seating surface for said closure member.

References Cited

UNITED STATES PATENTS

| | | | |
|---|---|---|---|
| 660,193 | 9/1900 | Loetzer | 137—269 X |
| 940,239 | 11/1909 | Dikkers | 251—361 X |
| 1,225,002 | 5/1917 | Beam | 137—329.03 |
| 1,698,097 | 1/1929 | Honywell | 137—329.05 X |
| 2,767,730 | 10/1956 | Laird | 137—329.02 |

WILLIAM F. O'DEA, *Primary Examiner.*

R. GERARD, *Assistant Examiner.*